Aug. 12, 1958     K. T. KÄLLE     2,846,873
VISCOSITY METER
Filed Feb. 21, 1956
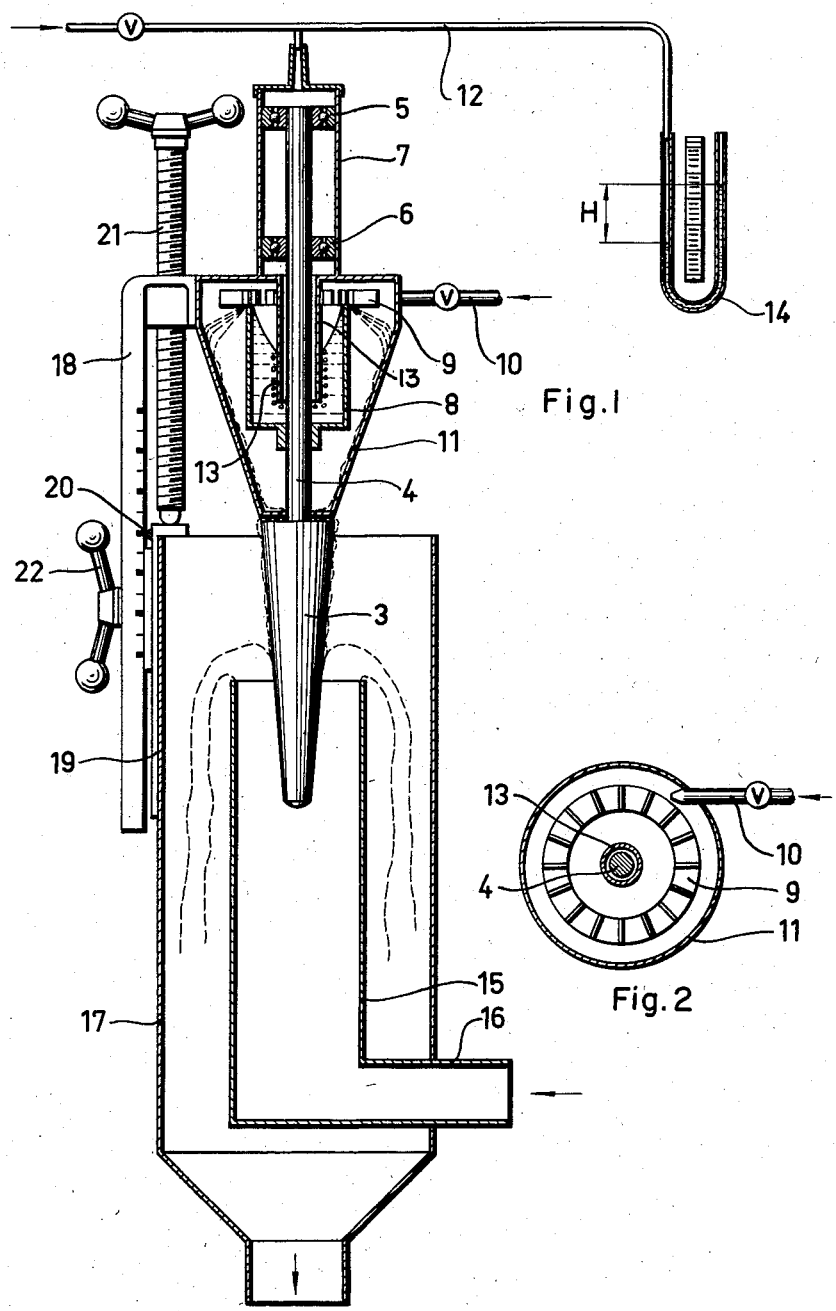

United States Patent Office 2,846,873
Patented Aug. 12, 1958

2,846,873

VISCOSITY METER

Karl Torsten Källe, Saffle, Sweden

Application February 21, 1956, Serial No. 566,978

Claims priority, application Sweden February 25, 1955

3 Claims. (Cl. 73—59)

The invention relates to a viscosity meter or consistence indicator intended for continuously indicating the viscosity or concentration of a flowing liquid or suspension. Such an apparatus comprises a rotary member which is to be submerged in the liquid to be measured and which may be driven either by a constant power or at a constant speed, so that its speed of rotation or torsional moment respectively will constitute a measure of the viscosity or concentration thereof.

Generally the rotary member has been submerged in a horizontal flow of liquid, but varying speeds of flow past the rotary member have shown to cause a disturbing effect on the results of measuring due to the varying torsional moments acting upon said member so that, if the speed of flow increases, the torsional moment decreases or, in other words, the rotary member rotates more easily in a fast-flowing medium than in a slowly flowing medium of equal viscosity. Of course, a decreased speed of flow brings about a reversed result. In practice, it is difficult to eliminate this drawback by arranging a constant flow past the rotary member, particularly as it is often desired to supply varying amounts per unit of time of the liquid, the viscosity of which is to be controlled.

According to the invention, this problem has now been solved by an apparatus which comprises in combination a vertical stationary tube having an open upper end, means for supplying liquid to be measured into a lower section of the tube to provide an upstream therein, said open tube end serving as an overflow outlet, a rotary member rotatable around a vertical axis and being at least somewhat tapered onto its lower free end, means for mounting the rotary member partly submerged into the tube, means for rotating said member and means indicating the resistance against its rotation caused by varying viscosity of the liquid.

In fact, it has shown that said vertical tube and rotary member can be dimensioned such that a certain relation is always prevailing between the speed of flow along the rotary member in the vertical tube and the liquid level in the overflow outlet. Thus, at an increased speed of flow the liquid level rises correspondingly, and a larger portion of the rotary member will come into contact with the fluid. This will counteract the reduction of the torsional moment otherwise caused by the increased speed of flow past said member.

By practical experiments it is rather easy to find what shape the rotary member should have in order that the decrease of the torsional moment caused by a higher speed of flow should be fully compensated by the increase of the torsional moment caused by the rising liquid level. Excellent results have been obtained with a conical member having a relatively small apex angle, although it is possible, or even probable, that the ideal shape deviates somewhat from the conical one and might rather be imagined as formed by a slightly arcuate directrix. Moreover, the cone angle will be dependent on several different factors, such as the mutual dimensions of the tube and the member, the approximate relation between the speed of flow and the speed of rotation, the kind of flowing liquid etc. It is a general rule that the speed of flow should not be too low in relation to the speed of rotation of the member, so that the liquid is subjected to considerable whirling motions. It may be mentioned as an example that the member can rotate at a speed of about 600 R. P. M. or a peripheral speed of about 1 m. per second, at the same time as the liquid flows at a speed of between 0.5 and 1 m. per second.

The apparatus according to the invention will be described more in detail with reference to the accompanying drawing, in which Fig. 1 shows an embodiment in vertical section, and
Fig. 2 shows a horizontal section.

The apparatus shown involves a further development of a device described in the U. S. Patent 2,468,370 and where a turbine wheel is arranged to drive the rotary member by a constant force so that the speed of rotation becomes directly dependent on the viscosity or concentration of the liquid. In the embodiment shown, the rotary member 3 is shaped as a truncated cone having an apex angle of about 10°. It is secured to the lower end of a vertical spindle 4 which is supported radially as well as axially by ball bearings 5, 6. The bearings are mounted in a housing 7, and below said housing the shaft is surrounded by a vessel 8 secured thereto and open at the top. A turbine wheel 9 is mounted on the upper rim of the vessel 8 to be driven by liquid supplied under constant pressure through a nozzle 10 (Fig. 2). The vessel 8 and the turbine wheel 9 are enclosed by a casing 11 secured to the bottom of the housing 7. The liquid driving the turbine flows partly down into the vessel 8 and is partly thrown against the inside of the casing 11 from where it flows down along the rotary member 3 which is thereby continuously rinsed.

The ball bearing housing 7 which communicates at the top with an air supply pipe 12, is provided at the bottom with a tubular extension 13 surrounding the rotating spindle 4 and opening into the vessel 8 below the liquid level. Air is led through the pipe 12 via the bearing housing 7 and the tube 13. In dependence on the speed of rotation the liquid in the vessel 8 forms a more or less deep paraboloid which determines the resistance to the outflow of the air through the tube 13. Thus, the pressure in the conduit 12 becomes directly proportional to the speed of rotation of the member 3, and this circumstance can in the known way be utilized for the indication and/or regulation of the viscosity or concentration of the liquid or suspension in which the member 3 rotates. In the embodiment shown, the pipe 12 is thus connected with a U-pipe manometer 14 indicating the pressure in for instance mm. water column. Alternatively or besides, the pipe 12 may be connected to regulating means of the type described in the U. S. Patent 2,598,177, which means may be adapted to keep the viscosity of the liquid constant by opening or throttling, in dependence on the pressure variations, a valve supplying a diluting liquid to the liquid controlled.

The rotary member 3 is partly submerged in the open upper end of a vertical tube 15, at the lower end of which the liquid to be controlled is supplied through a pipe 16. The member 3 is inserted axially and centrally in the tube opening, and its shape and dimensions must be adapted to the diameter of the tube 15 as well as to the kind of the liquid to be controlled. These facts can only be ascertained by practical experiments. For instance, it may be that the viscosity of viscose or the concentration of a fibre suspension is to be controlled.

The tube 15 is concentrically enclosed by a wider tube 17 serving as an outlet for the liquid discharged from the upper end of tube 15 and, moreover, forming a support for the actual apparatus. As apparent from Fig. 1, the casing 11 is fixed to a rod 18 bent perpendicularly downwards and slidable in vertical direction in a guide 19 provided at the outside of the tube 17. A pointer 20 on the guide points to a graduated scale on the rod 18. The height of the rotary member in the opening of the tube 15 is adjusted by means of a set screw 21 inserted through the upper, horizontal portion of the rod 18 and supported by the upper end of the guide. Another screw 22 is provided for locking the rod 18 in the desired position.

If it is assumed that the rotary member is adjusted at a certain level and that the turbine wheel is driven by a liquid of constant pressure, the member rotates at a constant speed as long as the viscosity of the liquid passing through the tube 15 is constant, and a constant difference in pressures, for instance the height H, is then to be read on the manometer 14. An increase of the speed of flow in the tube 15 should result in that the body is turned more easily and consequently faster, but as mentioned above this change in the torsional moment is compensated by a raise of the liquid level in the overflow outlet so that a further portion of the member 3 is touched by the liquid. If the pressure indicated on the manometer should change, this would consequently mean that the viscosity of the liquid had changed and, if desired, the manometer may be graded to indicate the viscosity of the liquid.

On the other hand, if it is desired to maintain a substantially constant indication (the height H) of the manometer the member 3 must be lowered, when the viscosity of the liquid decreases, and raised, when the viscosity increases. In this case the scale on the rod 18 may be graduated in viscosity or for instance concentration of pulp, and if the viscosity of the liquid is unknown, it is then possible to determine it by displacing the member 3 by means of the screw 21 into such a position that the height H is obtained on the manometer. Preferably, the apparatus described is used together with a regulator in such a way that the desired viscosity or concentration is in advance set on the scale, whereupon the regulator may be controlled by the varying air pressure in the pipe 12 to supply diluting liquid in quantities sufficient to maintain this viscosity.

If desired, the viscosity meter according to the invention may instead be driven at a constant speed by an electric motor, in which case a change in the viscosity appears in the form of a changed consumption of power to be read from a wattmeter. The latter, in turn, may be adapted to actuate relays which close and break the current to a motor opening and closing a valve for supplying a diluting fluid. Of course, such arrangements are previously known per se and do not constitute any part of the invention.

What I claim is:

1. A viscosity meter for continuously indicating the viscosity or concentration of flowing liquids and suspensions, comprising a vertical stationary tube having an open upper end, means for supplying liquid to be measured into a lower section of the tube to provide an upstream therein, said open tube end serving as an overflow outlet defining an overflow edge for said tube, a rotary member rotatable around a vertical axis and having the form of an elongated truncated cone with its inwardly tapering end directed vertically downwardly, mounting means supporting said rotary member and holding said rotary member only partly below the overflow edge of said tube, whereby said rotary member is only partly immersed in the fluid contained in and overflowing said tube, means for rotating said member and means indicating the resistance against its rotation caused by varying viscosity of the liquid.

2. A viscosity meter for continuously indicating the viscosity or concentration of flowing liquids and suspensions, comprising a vertical stationary tube having an open upper end, means for supplying liquid to be measured into a lower section of the tube to provide an upstream therein, said open tube end serving as an overflow outlet defining an overflow edge for said tube, a rotary member rotatable around a vertical axis and having the form of an elongated truncated cone with its inwardly tapering end directed vertically downwardly, mounting means supporting said rotary member and holding said rotary member only partly below the overflow edge of said tube, whereby said rotary member is only partly immersed in the fluid contained in and overflowing said tube, means for moving the rotary member in vertical direction and for setting it on a desired level, means for rotating said member and means indicating the resistance against its rotation caused by varying viscosity of the liquid.

3. A viscosity meter for continuously indicating the viscosity or concentration of flowing liquids and suspensions, comprising a vertical stationary tube having an open upper end, means for supplying liquid to be measured into a lower section of the tube to provide an upstream therein, said open tube end serving as an overflow outlet defining an overflow edge for said tube, a rotary member fixed to a vertical spindle and having the form of an elongated truncated cone with its inwardly tapering end directed vertically downwardly, mounting means supporting said rotary member and holding said rotary member only partly below the overflow edge of said tube, whereby said rotary member is only partly immersed in the fluid contained in and overflowing said tube, a turbine wheel mounted around the spindle above the rotary member, a pipe supplying to said turbine wheel a liquid jet having a constant force, a vessel containing liquid and fixed around the spindle below said turbine wheel, and means responsive to fluctuations in the liquid level in the vessel, caused by variations in the rotation speed.

References Cited in the file of this patent

UNITED STATES PATENTS

| | | |
|---|---|---|
| 1,321,736 | Green | Nov. 11, 1919 |
| 1,961,178 | Thomas | June 5, 1934 |
| 2,294,079 | Drabin | Aug. 25, 1942 |
| 2,468,370 | Kalle | Apr. 26, 1949 |